United States Patent [19]

Lochte et al.

[11] 4,121,616

[45] Oct. 24, 1978

[54] ARTICULATED FLUID LOADING ARM

[75] Inventors: Glen E. Lochte, Cypress, Tex.; Cryssis N. Pashalis, Soucy, France

[73] Assignee: FMC Corporation, San Jose, Calif.

[21] Appl. No.: 774,573

[22] Filed: Mar. 4, 1977

[51] Int. Cl.[2] .......................... B67D 5/00; F16L 3/00

[52] U.S. Cl. .................................... 137/615; 285/168; 141/387

[58] Field of Search ................ 137/615; 141/387, 279, 141/284, 388; 248/59, 280, 281; 285/152, 168

[56] References Cited

U.S. PATENT DOCUMENTS

| | | | |
|---|---|---|---|
| 3,050,092 | 8/1962 | Palcanis et al. | 141/387 |
| 3,154,118 | 10/1964 | Silveston | 137/615 |
| 3,176,730 | 4/1965 | Knight | 137/615 |
| 3,434,491 | 3/1969 | Bily | 137/615 |
| 3,498,325 | 3/1970 | Ashton et al. | 137/615 |
| 3,675,680 | 7/1972 | Frohlich et al. | 137/615 |

*Primary Examiner*—Martin P. Schwadron
*Assistant Examiner*—A. Michael Chambers
*Attorney, Agent, or Firm*—L. B. Guernsey; W. W. Ritt, Jr.

[57] ABSTRACT

An articulated fluid loading arm especially suited for transferring petroleum from a floating storage and loading terminal to a marine tanker. The arm comprises a support boom pivotally mounted on the deck of the terminal, a pair of fluid conduits extending along the boom from risers at the deck, and a dual-flow passage drop-pipe assembly suspended from a carriage that rides in a track on the boom. The drop-pipe assembly comprises four rigid pipe sections interconnected by swivel joints into a parallelogram-like structure, one corner thereof pivotally connected to the carriage and the opposite corner connected to a pull-in type pipe connector for releasably securing the arm to a tanker manifold. A tensioning cable extends from the pipe connector up to the carriage and then along the boom and around a motion-compensating tensioner to a dead-man winch for lowering, raising, and supporting the drop-pipe assembly, and means are provided to disconnect the drop-pipe assembly from the fluid conduits at the outer end of the boom so that the assembly can be brought in on the carriage to the station deck for servicing. A tag line connected between the pipe connector and a tanker winch allows the pipe connector to be gently pulled down to connect with the tanker manifold even when the tanker is moving up and down.

20 Claims, 7 Drawing Figures

ARTICULATED FLUID LOADING ARM

BACKGROUND OF THE INVENTION

1. Field of the Invention

This invention relates to fluid loading arms, and more particularly to articulated marine loading arms for transferring fluid between an offshore facility and a tanker or other marine vessel.

2. Description of the Prior Art

The production of oil and gas from offshore wells has developed into a major endeavor of the petroleum industry, and this growth has fostered extensive interest and investigation into means for transporting the produced fluids to shore-based refineries or storage facilities. Although in many instances pipelines are employed for this purpose, more and more wells are being drilled and completed in deepwater locations where the use of marine tankers of very large capacity constitutes the most practical and efficient transportation method, such as where pipelines would be too costly or difficult to construct.

Some of the prior art loading facilities include a fluid handling means such as a fixed mooring buoy or a floating platform to which a tanker may be moored while loading. Connected to the floating platform are a number of flexible hoses for transferring fluid to the tanker. A tender is normally required to assist the tanker in picking up the flexible hoses for connection to the tanker's manifold. Such an arrangement not only requires the use of a tender, but movement of the tanker may cause the flexible hoses to be broken.

SUMMARY OF THE INVENTION

The present invention comprises an articulated loading arm for transferring fluid from a first fluid handling means to a second handling means, and to provide for relative movement between these two handling means. This invention overcomes some of the disadvantages of the prior art by employing a tower or other suitable vertical support structure that is mounted on a platform or other first fluid handling means, and a generally horizontally-disposed support boom having one end thereof pivotally connected to the top of the tower or support structure. A drop-pipe assembly on the support boom includes a pair of rigid upper conduit members and a pair of lower conduit members. The upper ends of the upper conduit members are pivotally connected to the support boom while the lower ends of the upper conduit members are each pivotally connected to the upper end of a corresponding one of the lower conduit members. A support cable means for supporting the weight of the conduit assembly and the fluid therein is connected to the lower end of each of the lower conduit members so that the conduit members can be raised and lowered in accordance with the relative motion of the boom and the second fluid handling means. The pivotal connections between the upper end of the upper conduit members and between the upper end of the lower conduit members and the lower end of the upper conduit members also allows for relative movement between the second fluid handling means and the support boom. A motion compensating means maintains a substantially zero relative motion between the second fluid handling means and the lower end of each of the lower conduit members even when the second fluid handling means is moving up and down. A means for transporting fluid is connected between the first fluid handling means and the upper end of each of the upper conduit members.

DESCRIPTION OF THE PREFERRED EMBODIMENT

Figure 1:
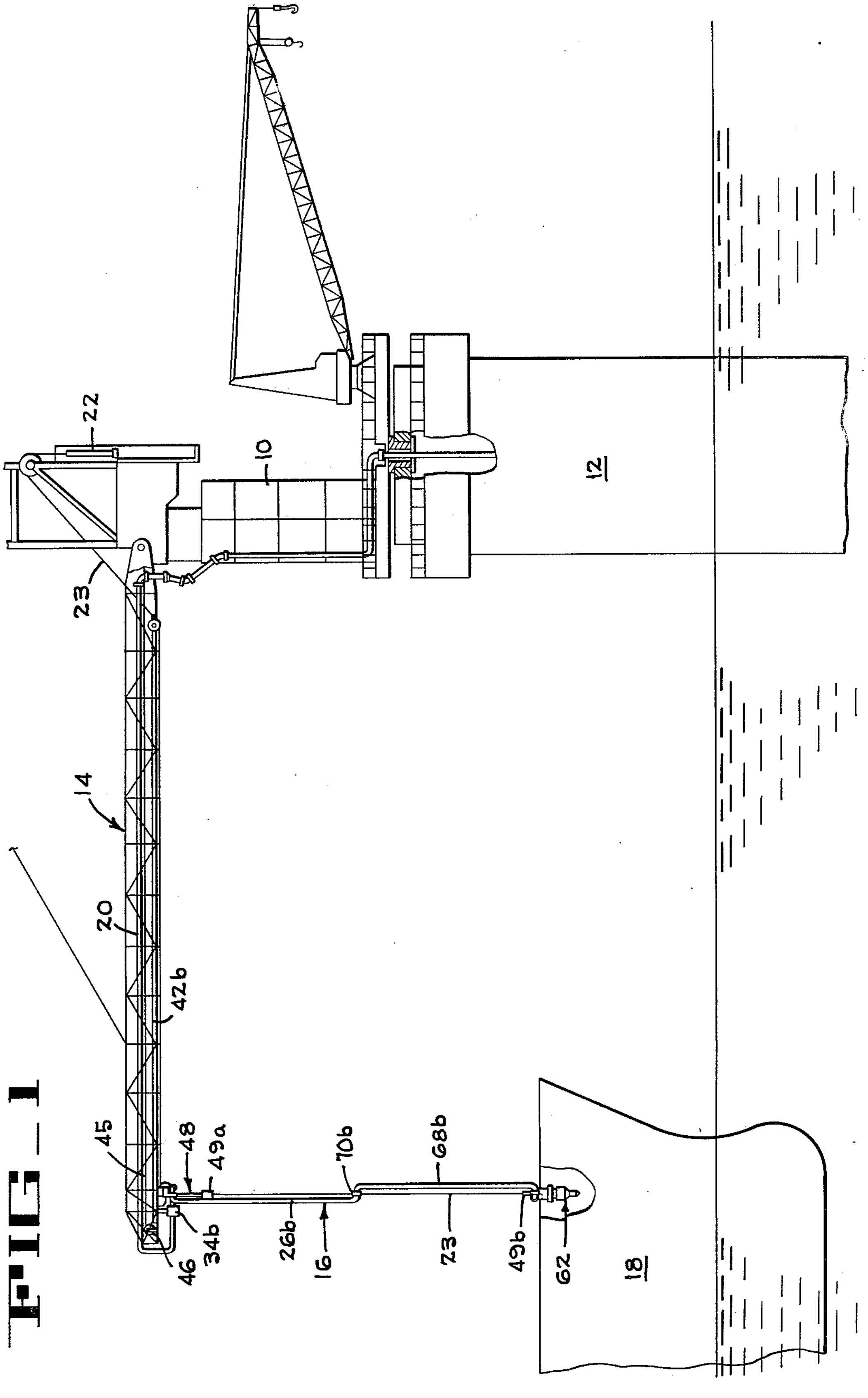
FIG. 1 is a side elevation of an articulated fluid loading arm according to the present invention, the arm shown connected in operating position to a marine tanker.
Figure 2:
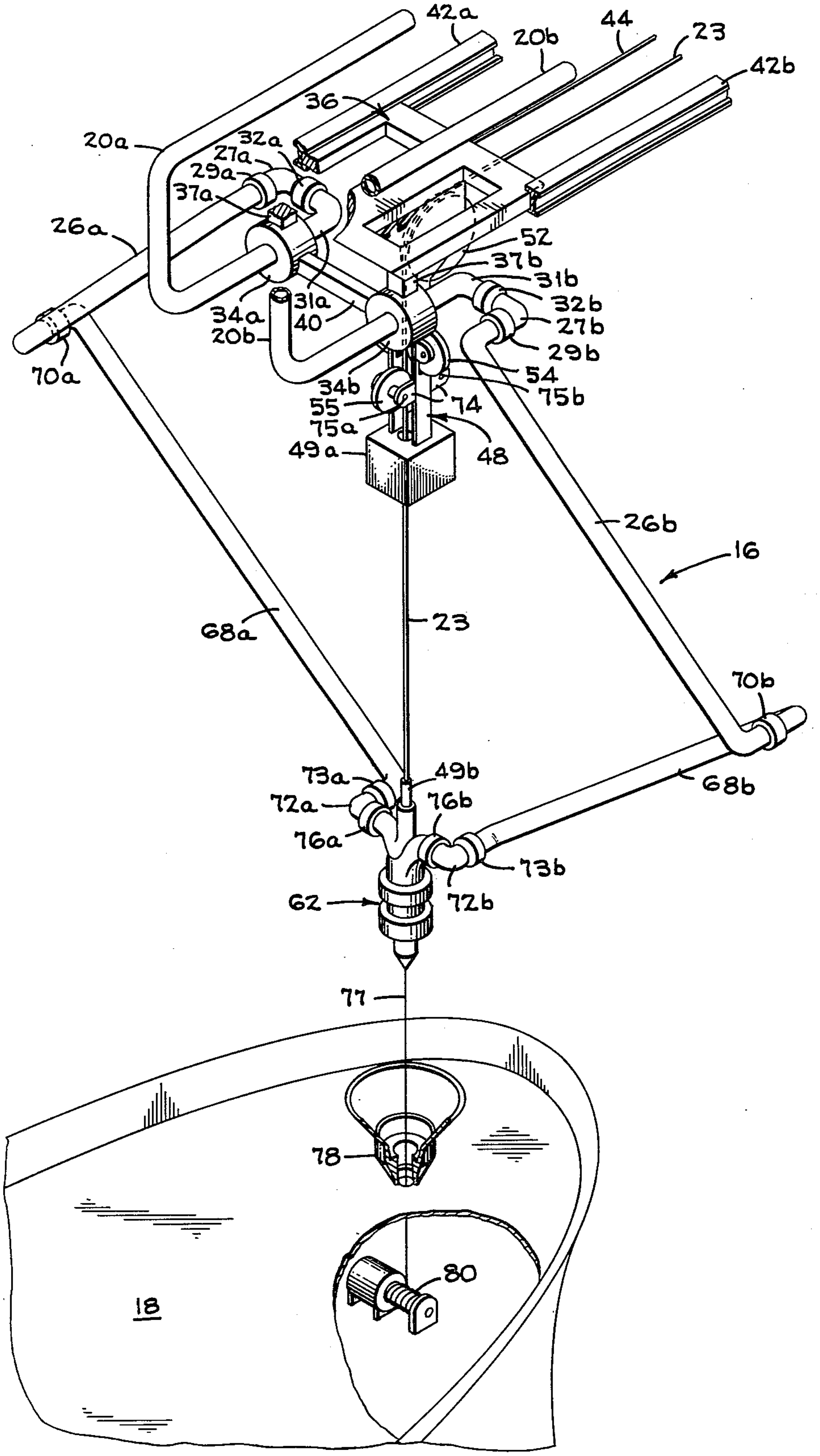
FIG. 2 is an enlarged isometric view of a portion of the loading arm of FIG. 1 showing details of the vertical portion of the arm.
Figure 3:
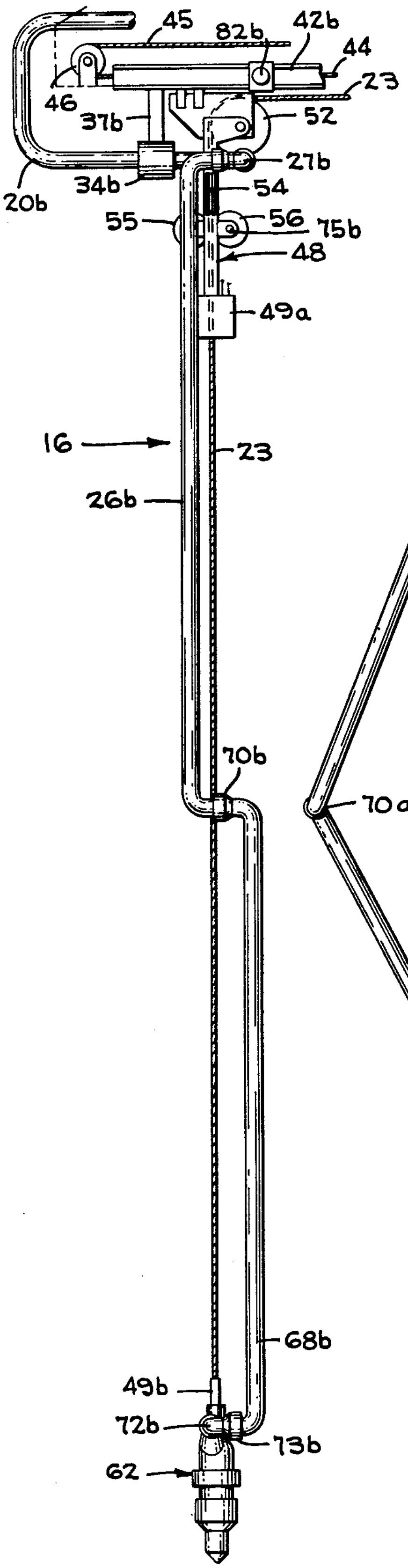
FIG. 3 is a side elevation of a portion of the loading arm of FIG. 1 in an extended position.
Figure 4:
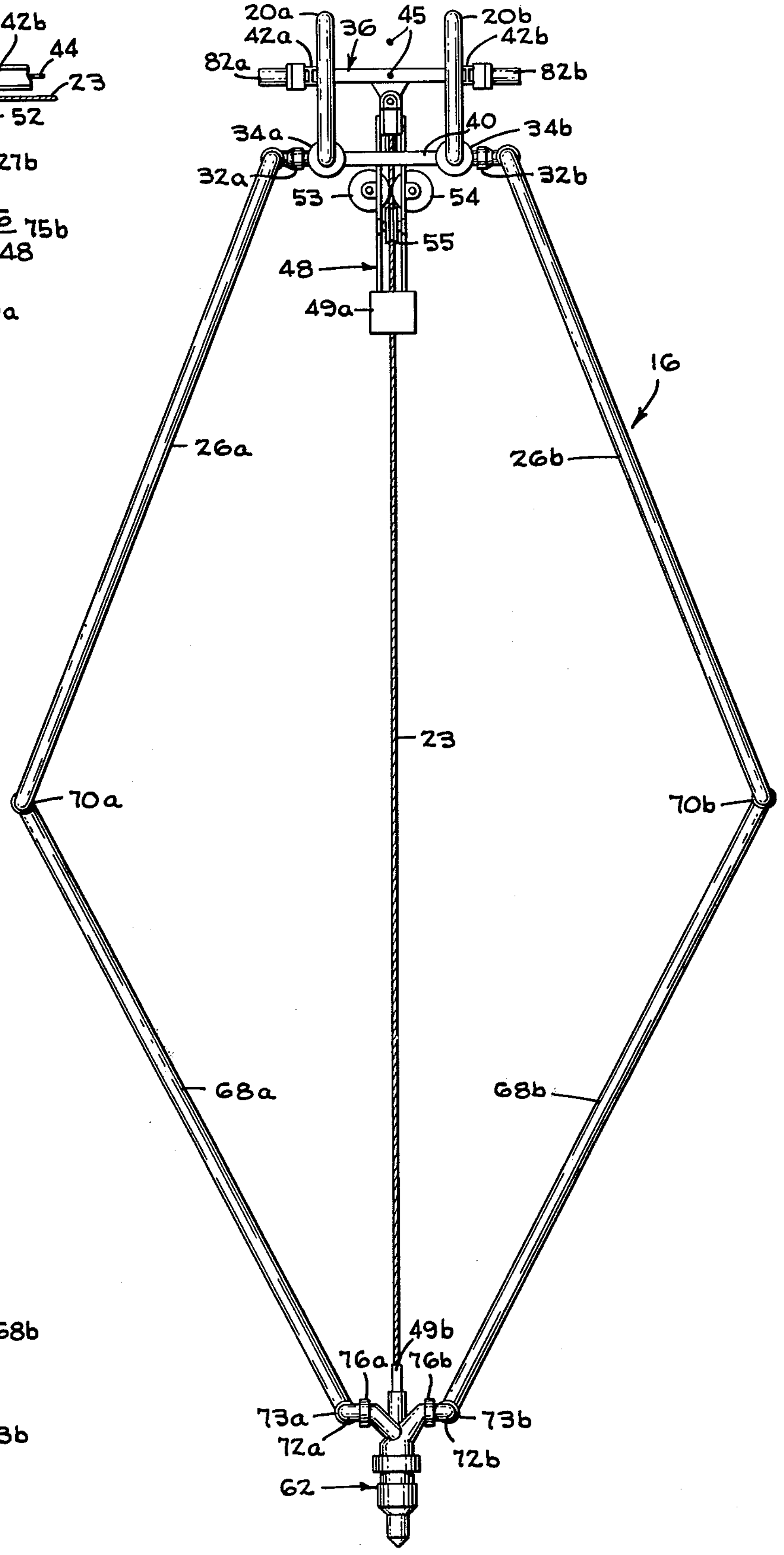
FIG. 4 is a front elevation of a portion of the loading arm shown in FIG. 3.

An articulated fluid loading arm in accordance with the present invention comprises a tower or other suitable vertical support structure 10 (FIG. 1) mounted on the top of a platform 12 and having a generally horizontally-disposed boom 14 pivotably connected at the inboard end thereof to the tower 10. An articulated vertical portion 16 of the loading arm is connected between the outboard end of the boom 14 and a marine tanker 18. A pipe assembly 20 is connected to the upper end of the articulated vertical portion 16 and extends through the boom 14 and downward through the tower 10 and platform 12 to a fluid source (not shown). A hydraulic tensioner 22 and a cable 23 (FIGS. 1–4) provide means for supporting the weight of the articulated vertical portion 16 of the loading arm while the tanker moves in the sea. The tensioner 22 is a type which is widely used for supporting heavy loads suspended from floating structures and details of this commonly used device are not considered to be a part of this invention. One such tensioner which can be used is the Model Twin 80 manufactured by the Rucker Shaffer Corporation, Oakland, California.

The articulated portion 16 of the loading arm includes a pair of upper conduit members **26*a* and 26*b* (FIG. 2) that are connected at their upper ends to corresponding elbows 27*a*, 27*b* by swivel joints 29*a*, 29*b*. The elbows 27*a*, 27*b* are each connected to a corresponding elbow 31*a*, 31*b* by one of the swivel joints 32*a*, 32*b*. The elbows 31*a*, 31*b* are each releasably connected to a corresponding length of pipe 20*a*, 20*b* by a hydraulic or otherwise remotely operable pipe connector 34*a*, 34*b*. Each of the pipe connectors 34*a*, 34*b* is secured to a support carriage 36 by one of a pair of support members 37*a*, 37*b* (FIGS. 2, 6) and these connectors are secured to each other by a horizontally disposed support element 40. The connectors 34*a*, 34*b* are secured to the ends of the respective elbows 31*a*, 31*b*, thus providing support for the vertical portion 16 of the loading arm, but when these connectors are actuated they release their connection to the pipes 20*a*, 20*b***.

The support carriage 36 is slidably mounted within a pair of support rails **42*a*, 42*b* of the boom 14 (FIG. 2), so that when the connectors 34*a*, 34*b* are released from the pipes 20*a*, 20*b* the arm's entire vertical portion 16 and the carriage may be moved as a unit along the rails 42***a*, 42*b* toward the tower 10 where the vertical portion 16 may be serviced or repaired. For example, it may be desirable to repack the various joints in the vertical portion 16. A cable 44, connected to the carriage 36 (FIGS. 1 and 5), may be used to pull the carriage to the tower 10, while a cable 45 which is threaded about a sheave 46 may be used to return the carriage to the outboard end of the boom 14 when servicing or repairs have been completed.

Figure 6:
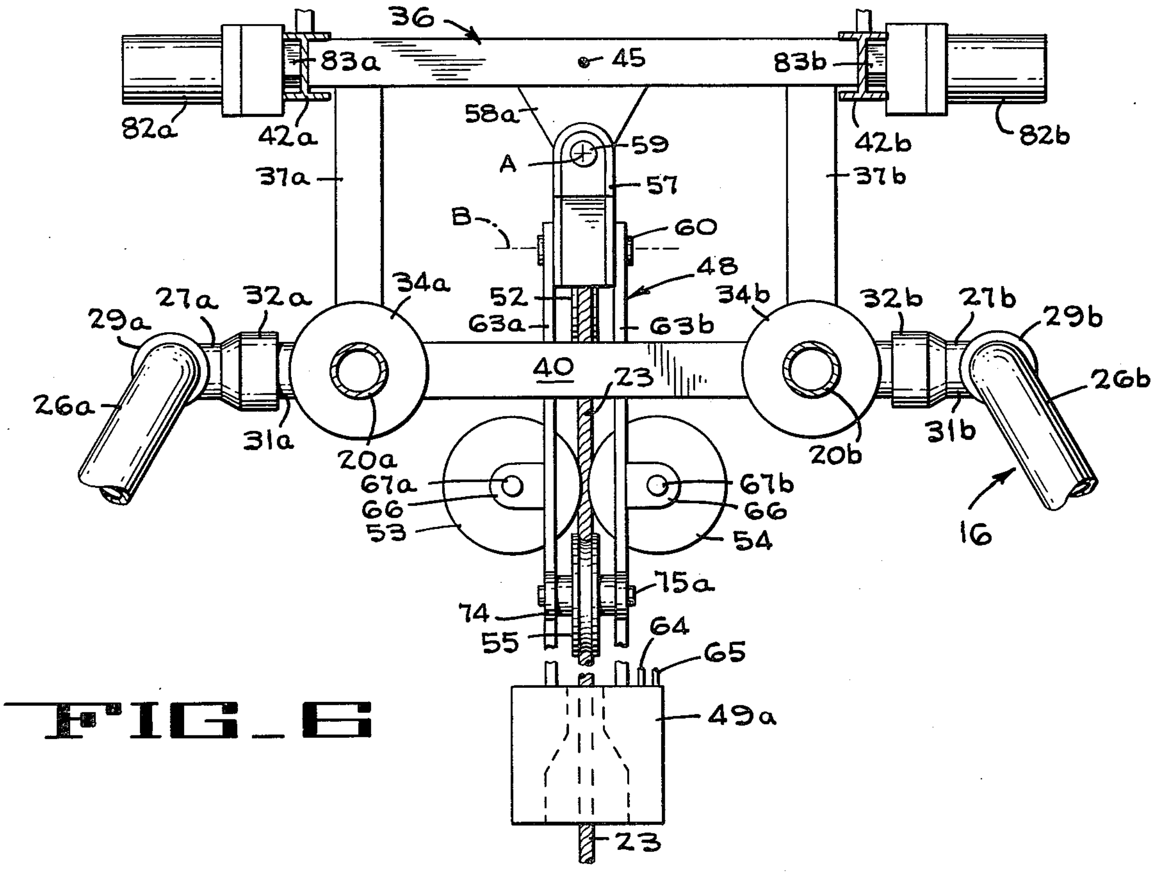
FIG. 6 is a front elevation of the portion of a loading arm shown in FIG. 5.
Figure 5:
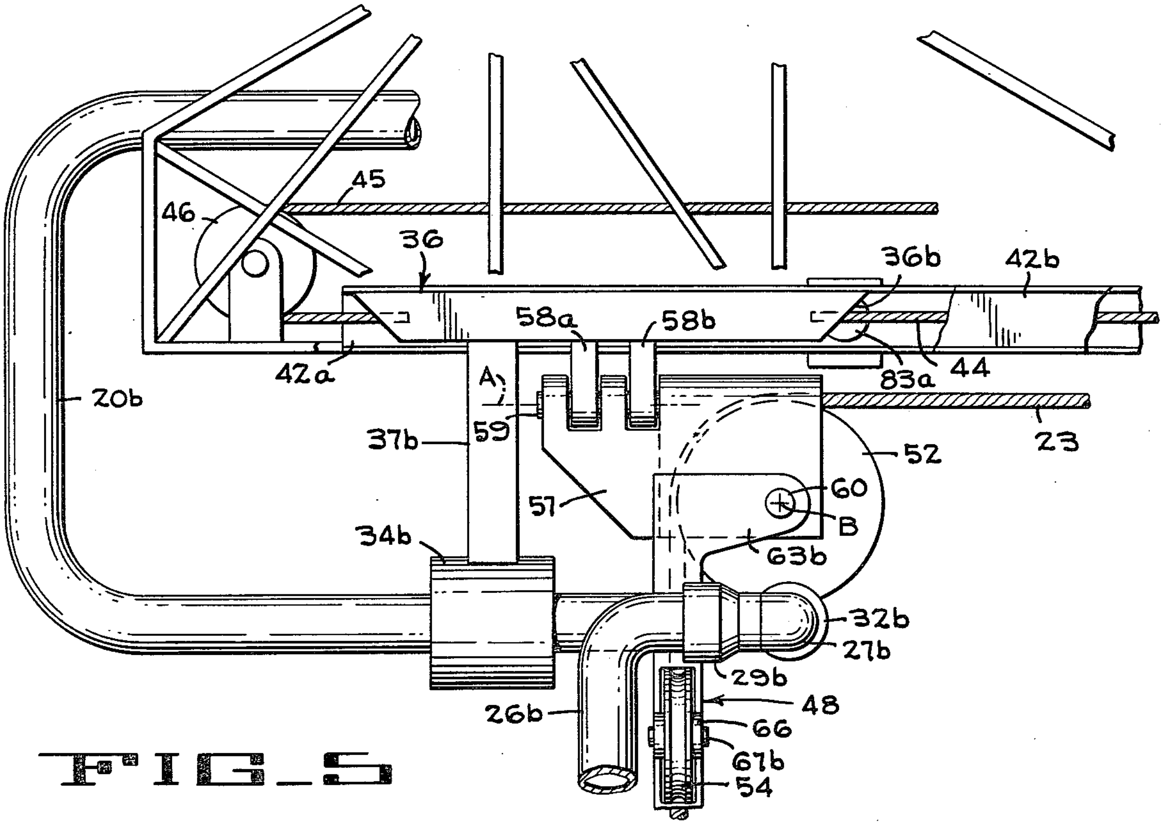
FIG. 5 is an enlarged fragmentary side elevation of a portion of the loading arm of FIG. 3.

Also connected to the support carriage 36 is a hanger 48 from which is suspended a female component 49*a* of a hydraulic actuated pipe connector 49 and a plurality of guide sheaves 52–56 (FIGS. 2–6). The hanger 48 includes a somewhat clevis-like support member 57 which is pivotally connected at the upper end thereof to a pair of ears 58*a*, 58*b* by a pin 59. The ears 58*a*, 58*b* are welded or otherwise secured to the underside of the support carriage 36. The support member 57 is pivotally connected to a pair of vertical straps 63*a* and 63*b* by a pin 60. The entire hanger 48 is free to pivot about a longitudinal axis A, and the vertical straps 63*a*, 63*b* are free to pivot about a transverse axis B, all as seen in FIGS. 5 and 6. The sheaves 53 and 54 are each connected to one of the vertical straps 63*a*, 63*b* by a pair of ears 66, only one of which is shown in FIG. 6, and by a pin 67*a*, 67*b*. The ears are welded or otherwise connected to the corresponding strap. The sheaves 55 and 56 are each connected to the vertical straps 63*a*, 63*b* by a pair of ears 74 and by a pin 75*a*, 75*b*.

The carriage 36 is locked into working position at the outboard end of the horizontal boom 14 (FIG. 5) by a pair of hydraulic cylinders 82*a*, 82*b* (FIG. 6) each having a semicircular piston rod 83*a*, 83*b*. When the hydraulic cylinders 82*a*, 82*b* are energized, their rods 83*a*, 83*b* extend and engage the rear edges (such as 36*b* of FIG. 5) of the carriage 36, thereby preventing the carriage from moving toward the tower. When the cylinder rods 83*a*, 83*b* are retracted, the carriage is free to be moved along the rails 42*a*, 42*b* to the tower.

The cable 23 is trained over the sheave 52 at the carriage 36 and then descends between the guide sheaves 53, 54, the guide sheaves 55, 56, and finally through a bore in the hydraulic connector 49 to the male component 49*b* of the connector 49. When the connector's male component 49*b* is pulled into the female component 49*a* and hydraulic fluid is supplied to the connector through an inlet 64 (FIG. 6), the connector components 49*a*, 49*b* are locked together. When hydraulic fluid is supplied to the connector through an inlet 65, the male component 49*b* is released from the locked position and is free to move downward out the lower end of the female component 49*a*.

The lower half of the articulated vertical portion 16 of the loading arm includes a pair of lower conduit members 68*a* and 68*b* (FIGS. 2–4), each having the upper end thereof connected to the lower end of a corresponding one of the upper conduit member 26*a*, 26*b* by a swivel joint 70*a*, 70*b*. The lower end of the conduit member 68*a* is connected to an elbow 72*a* by a swivel joint 73*a*. The elbow 72*a* is connected to a male pipe connector element 62 by a swivel joint 76*a*, and the lower conduit member 68*b* is similarly connected between the male connector element 62 and the lower end of the upper conduit member 26*b* by swivel joints 70*b*, 73*b* and 76*b*, and by an elbow 72*b*.

Figure 7:
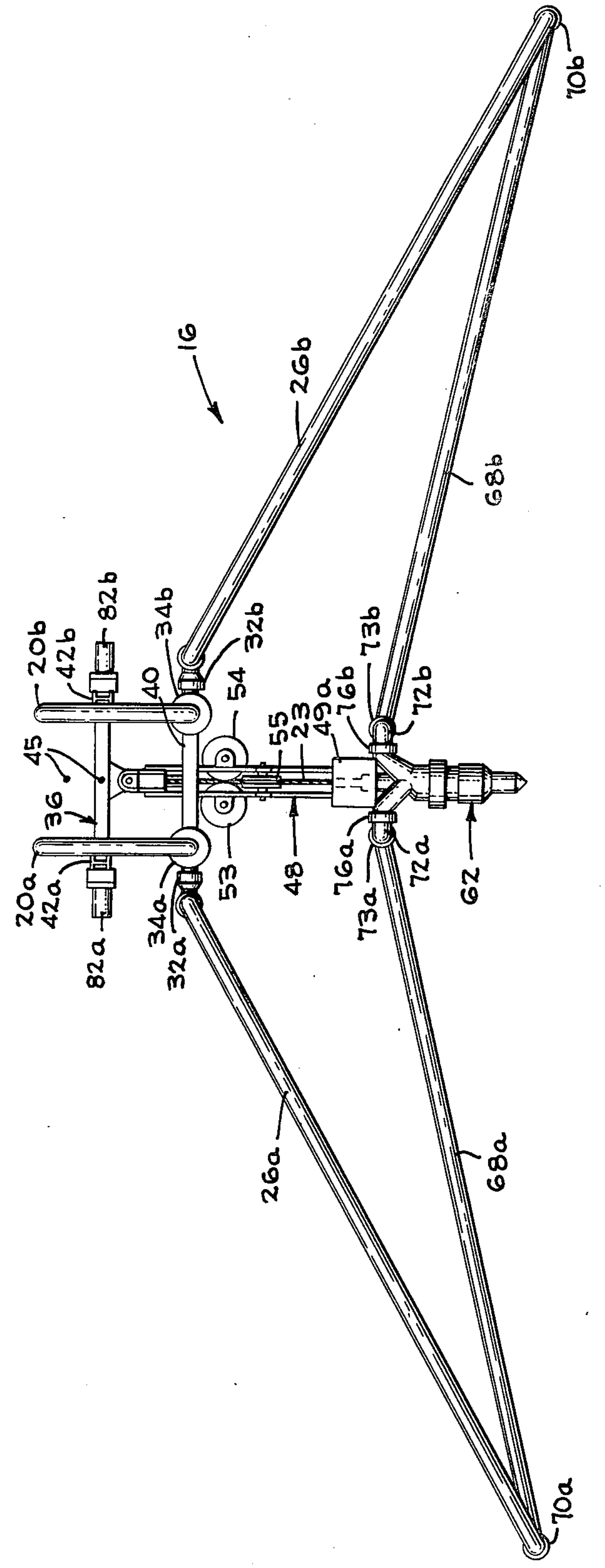
FIG. 7 is a front elevation, similar to FIG. 4, showing the loading arm in the stowed position.

The articulated vertical portion 16 of the loading arm is biased into the stowed position shown in FIG. 7 by the hydraulic tensioner 22 and the cable 23 (FIG. 1). A tag line 77 connected to the lower end of the male connector 62 (FIG. 2) is used to pull the connector element 62 into a fluid-tight working position inside a female connector element 78. The female connector element 78 is mounted on or otherwise connected to the tanker manifold (not shown), and thus is in fluid communication with the cargo compartments of the vessel. The lower end of the tag line 77 is wound around a winch 80 which provides a downward counter force on the male connector element 62 to overcome the upward bias which is supplied by the tensions 22.

Operation of the Loading Arm

The arm's articulated vertical portion 16 normally is in its stowed position (FIG. 7) since the tensioner 22 and the cable 23 (FIG. 1) constantly exert an upward force on the male connector element 62 tending to pull the male component 49*b* of the connector 49 inside the female component 49*a*. When the tanker 18 is moved into loading-unloading position the lower end of the tag line 77 is connected to the winch 80, and actuation of the winch tensions the tag line sufficiently to overcome the upward force exerted by the cable 23, thereby pulling the male connector element 62 downward ito the female connector element 78. Since the tensioner 22 maintains an upward force on the cable 23 at all times, the tag line 77 is always in tension. Thus the connector element 62 moves up and down with the tanker, thereby facilitating connection and disconnection of the arm to the tanker in a smooth and gentle manner without damage to any element of the apparatus.

Once the connector element 62 is secured into the connector element 78, the swivel joints 29*a*, 29*b*, 70*a*, 70*b*, 73*a* and 73*b* allow the conduit members 26*a*, 26*b*, 68*a*, and 68*b* to move up and down with the tanker, thereby compensating for roll and lateral drift of the tanker relative to the tower 10 and boom 14. The swivel joints 32*a*, 32*b*, 76*a* and 76*b* allow the conduit members and the connector element 62 to compensate for movement of the tanker longitudinally toward or away from the tower 10. Furthermore, pivotal or swinging movement of the tanker about the longitudinal axis through the connector elements 62, 78 is facilitated by their cylindrical configuration. Accordingly, universal movement of the tanker with respect to the boom 14 and tower 10 is provided by this unique apparatus.

At the top of the arm's vertical portion 16 the pin 59 (FIG. 6) allows the hanger 48 to pivot laterally relative to the slidable support carriage 36, thereby allowing the hanger 48 and the cable 23 to follow any side-to-side movement of the connector element 62. In a similar manner the pin 60 (FIG. 6) allows the hanger 48 and the cable 23 to follow angular movement of the tanker toward or away from the support tower 10. Thus the cable 23 always extends in a straight line between the sheave 52 and the male connector component 49*b*.

When replacement of fluid seals at the joints or other service or repair is required, the articulated vertical portion 16 (FIG. 2) is disconnected from the pipes 20*a*, 20*b* at the pipe connectors 34*a*, 34*b*. The hydraulic cylinders 82*a*, 82*b* must first be actuated to retract the cylinder rods 83*a*, 83*b* (FIGS. 5 and 6) and the pipe connectors 34*a*, 34*b* disconnected. The carriage 36 and the vertical portion 16 are pulled to the tower 10 (FIG. 1) by the cable 23. The service or repair is performed on the joints or other portions of the vertical portion 16, or on the carriage 36 or on the pipe connectors 34*a*, 34*b* and the carriage is pulled into place at the outboard end of the boom 14. The connections are made at the pipe connectors 34*a*, 34*b* and the carriage is again locked into place by the hydraulic cylinders 82*a*, 82*b*.

Accordingly, it can be seen that the present invention described herein provides a novel articulated fluid loading arm for transferring fluid from one fluid handling means to another. The loading arm is mounted on a first fluid handling means and discloses motion compensating means for maintaining a substantially zero relative motion between the loading arm and a second fluid handling means. A carriage is movable along a boom connected to the first fluid handling means so that the loading arm can be pulled in to the first fluid handling means for service. This eliminates the need for service boats, cranes, etc. to service the loading arm at the outboard end of the boom.

Although the best mode contemplated for carrying out the present invention has been herein shown and described, it will be apparent that modification and variation may be made without departing from what is regarded to be the subject matter of the invention.

What is claimed is:

1. An articulated loading arm for transferring fluid from one fluid handling means to another and to provide for relative movement between the different handling means, said arm comprising:

a support structure for mounting on a first fluid handling means;

a support boom having an inboard end connected to the support structure;

a drop-pipe assembly suspended generally vertically from said support boom, said drop-pipe assembly including (a) a plurality of rigid upper conduit members, (b) means for pivotally connecting the upper end of each of said upper conduit members to said support boom, (c) a plurality of rigid lower conduit members, (d) means for pivotally connecting the upper end of each of said lower conduit members to the lower end of a corresponding one of said upper conduit members, said pivotal connecting means facilitating diverging movement of the lower ends of said upper conduit members, and likewise of the upper ends of said lower conduit members, when the lower ends of said lower conduit members move toward the upper ends of said upper conduit members; and means for transporting fluid between said first fluid handling means and the upper end of each of said upper conduit members.

2. An articulated loading arm as defined in claim 1 wherein said means for transporting fluid between said first fluid handling means and the upper end of said conduit members includes a pipe having one end thereof connected to said first fluid handling means and means for connecting the other end of said pipe to one of the upper ends of said upper conduit members.

3. An articulated loading arm as defined in claim 1 wherein said means for pivotally connecting the upper end of each of said upper conduit members to said support boom includes means for connecting said upper conduit members for pivotal movement in both a longitudinal direction and in a transverse direction for universal movement of said conduit members relative to said support boom.

4. An articulated loading arm as defined in claim 1, including means for supporting and vertically positioning the lower end of said drop-pipe assembly with respect to said support boom.

5. An articulated loading arm as defined in claim 1, including motion compensating means for maintaining a substantially zero relative motion between a second fluid handling means and the lower end of said drop-pipe assembly.

6. An articulated loading arm as defined in claim 1, including a support carriage movably mounted on said support boom, and means for interconnecting said support carriage and said drop-pipe assembly.

7. An articulated loading arm as defined in claim 1, wherein the drop-pipe assembly further includes means for releasably connecting said assembly to a fluid transfer vessel.

8. An articulated loading arm as defined in claim 7, wherein said releasably connecting means comprises a fluid-conducting connector member for establishing fluid-tight communication with said fluid transfer vessel.

9. An articulated loading arm for transferring fluid from one fluid handling means to another and to provide for relative movement between the different handling means, said arm comprising:

a support structure for mounting on a first fluid handling means;

a support boom having an inboard end connected to the support structure;

a movable support carriage mounted for movement along the length of said support boom;

a plurality of rigid upper conduit members;

means for pivotally connecting the upper end of each of said upper conduit members to said carriage;

a plurality of rigid lower conduit members;

means for pivotally connecting the upper end of each of said lower conduit members to the lower end of a corresponding one of said upper conduit members;

means for supporting said lower conduit members and to provide vertical positioning of said lower conduit members relative to an outboard end of said support boom;

motion compensating means for maintaining a substantially zero relative motion between a second fluid handling means and the lower end of each of said lower conduit members; and means for transporting fluid between said first fluid handling means and the upper end of each of said upper conduit members.

10. An articulated loading arm as defined in claim 9 including a support rail connected along the length of said boom and means for mounting said support carriage for movement of said carriage along the length of said support rail.

11. An articulated loading arm as defined in claim 9 including means for moving said carriage along the length of said support boom.

12. An articulated loading arm as defined in claim 9 including means for releasably locking said support carriage in working position at the outboard end of said support boom.

13. An articulated loading arm as defined in claim 9 wherein said motion compensating means includes a hydraulic tensioner; means for connecting said hydraulic tensioner to said cable support means; a tag line; and means for connecting said tag line between second fluid handling means and said lower conduit members.

14. An articulated loading arm for transferring fluid from one fluid handling means to another and to provide for relative movement between the different handling means, said arm comprising:

a support structure for mounting on a first fluid handling means;

a support boom having an inboard end connected to the support structure;

a plurality of rigid upper conduit members;

means for pivotally connecting the upper end of each of said upper conduit members to said support boom;

a plurality of rigid lower conduit members;

means for pivotally connecting the upper end of each of said lower conduit members to the lower end of a corresponding one of said upper conduit members;

means for supporting said lower conduit members and to provide vertical positioning of said lower conduit members relative to an outboard end of said support boom;

motion compensating means for maintaining a substantially zero relative motion between a second fluid handling means and the lower end of each of said lower conduit members, said motion compensating means including a hydraulic tensioner and means for connecting said tensioner to said lower conduit member support means;

a tag line;

means for connecting said tag line between second fluid handling means and said lower conduit members;

a winch for pulling the lower ends of said lower conduit members into fluid-transferring engagement with said second fluid handling means;

means for mounting said winch on said second fluid handling means;

means for connecting said tag line to said winch; and means for transporting fluid between said first fluid handling means and the upper end of each of said upper conduit members.

15. An articulated loading arm for transferring fluid from one fluid handling means to another and to provide for relative motion between the different handling means, said arm comprising;

a support structure for mounting on a first fluid handling means;

a support boom having an inboard end pivotally connected to the upper portion of said support structure;

a drop-pipe assembly suspended generally vertically from said support boom, said drop-pipe assembly including (a) a pair of rigid upper conduit members, (b) means for pivotally connecting the upper end of each of said upper conduit members to the outboard portion of said support boom, (c) a pair of rigid lower conduit members, (d) first means for pivotally connecting the upper end of one of said lower conduit members to the lower end of a corresponding one of said upper conduit members, and (e) second means for pivotally connecting the upper end of the other lower conduit member to the lower end of the other upper conduit member, said first and second pivotal connecting means providing for movement of the lower ends of said upper conduit members away from each other, and likewise movement of the upper ends of said lower conduit members away from each other, when the lower ends of said lower conduit members move toward the upper ends of said upper conduit members;

means for vertically positioning said lower conduit members relative to said outboard portion of said support boom; and means for conducting fluid between said first fluid handling means and the upper end of each of said upper conduit members.

16. An articulated loading arm as defined in claim 15 including a movable carriage connected for movement along the length of said support boom, and means for pivotally connecting the upper end of each of said upper conduit members to said carriage.

17. An articulated loading arm for transferring fluid from one fluid handling means to another and to provide for relative movement between the different handling means, said arm comprising:

a vertical support structure for mounting on a first fluid handling means;

a support boom having an inboard end pivotally connected to said support structure;

a drop-pipe assembly suspended generally vertically from said support boom, said drop-pipe assembly including (a) a pair of rigid upper conduit members, (b) means for pivotally connecting the upper end of each of said upper conduit members to said support boom, (c) a pair of rigid lower conduit members, (d) first means for pivotally connecting the upper end of one of said lower conduit members to the lower end of a corresponding one of said upper conduit members, and (e) second means for pivotally connecting the upper end of the other lower conduit member to the lower end of the other upper conduit member, said first and second pivotal connecting means facilitating diverging movement of the lower ends of said upper conduit members, and likewise of the upper ends of said lower conduit members, when the lower ends of said lower conduit members move toward the upper ends of said upper conduit members;

a support cable;

tensioner means mounted on said support structure;

means for connecting said support cable between said tensioner means and the lower end of each of said lower conduit members;

a tag line;

means for connecting said tag line between a second fluid handling means and the lower end of each of said lower conduit members; and means for transporting fluid between said first fluid handling means and the upper end of each of said upper conduit members.

18. An articulated loading arm as defined in claim 17, including a support carriage mounted on said support boom for movement longitudinally thereon, means for preventing said longitudinal movement of said support carriage, and means for interconnecting said support carriage and said drop-pipe assembly.

19. An articulated loading arm as defined in claim 18, wherein said interconnecting means comprises a remotely controllable pipe connector.

20. An articulated loading arm as defined in claim 17, wherein said drop pipe assembly also includes means for releasably connecting said assembly to a fluid transfer vessel.

* * * * *